United States Patent [19]

Akita

[11] Patent Number: 5,615,897
[45] Date of Patent: Apr. 1, 1997

[54] GASKET MATERIAL LAYER INCLUDING CORK, FIBERS, RUBBER, AND A RUBBER CHEMICAL

[75] Inventor: Hiroaki Akita, Oyamacho, Japan

[73] Assignee: U-Sun Gasket Corporation, Shizuoka, Japan

[21] Appl. No.: 529,157

[22] Filed: Sep. 15, 1995

[30] Foreign Application Priority Data

Sep. 19, 1994 [JP] Japan .................................... 6-250040

[51] Int. Cl.⁶ .................................................. F16J 15/12
[52] U.S. Cl. .................. 277/233; 277/235 A; 277/DIG. 6
[58] Field of Search ................................ 277/233, 235 B, 277/235 A, DIG. 6; 428/283, 224, 243, 288

[56] References Cited

U.S. PATENT DOCUMENTS

| | | | |
|---|---|---|---|
| 2,076,401 | 4/1937 | Emanuel | 277/233 |
| 2,753,199 | 7/1956 | Victor | 277/233 |
| 3,660,184 | 5/1972 | Burelle et al. | |
| 3,770,480 | 11/1973 | Farnam | |
| 4,402,518 | 9/1983 | Locacius | 277/235 B |
| 4,423,109 | 12/1983 | Greenman et al. | |
| 4,485,138 | 11/1984 | Yamamoto et al. | 277/235 B |
| 4,508,777 | 4/1985 | Yamamoto et al. | 277/235 B |
| 4,748,075 | 5/1988 | Beyer et al. | 277/235 B |
| 4,783,087 | 11/1988 | DeCore et al. | 277/233 |
| 4,786,670 | 11/1988 | Tracy et al. | 277/235 B |
| 4,834,279 | 5/1989 | McDowell et al. | 277/235 B |
| 4,997,193 | 3/1991 | Czernik | 277/233 |
| 5,240,766 | 8/1993 | Foster | |
| 5,272,198 | 12/1993 | Kaminski et al. | |
| 5,286,574 | 2/1994 | Foster | |
| 5,472,995 | 12/1995 | Kaminski et al. | |

FOREIGN PATENT DOCUMENTS

| | | | |
|---|---|---|---|
| 1091137 | 4/1994 | Japan | 277/233 |
| 459544 | 1/1937 | United Kingdom | 277/DIG. 6 |

*Primary Examiner*—Scott Cummings
*Attorney, Agent, or Firm*—Wenderoth, Lind & Ponack

[57] ABSTRACT

A gasket material includes a sheet metal having a coating of adhesive applied thereon, and a coating layer of a compound or composition formed on the surface of the sheet metal, the compound or composition containing a fibrous material, fine cork particles and a rubber material. The gasket material provides improved material properties, including increased tensile strength, reduced stress relaxation, increased wear resistance and the like, while maintaining the capability of restoring itself from an applied compression.

8 Claims, 1 Drawing Sheet

I Prior art rubber coating gsket material

II Prior art rubber coating gsket material with fibrous material

III Gasket material of the present invention

GASKET MATERIAL LAYER INCLUDING CORK, FIBERS, RUBBER, AND A RUBBER CHEMICAL

FIELD OF THE INVENTION

In general, the present invention relates to a gasket material that may be used as a base material for making various types of gaskets. In particular, the invention relates to a gasket material including a sheet metal (metal plate or blank) and a coating layer of a compound or composition including any foam material and formed on the surface of the sheet metal.

PRIOR ART

A conventional gasket material of a similar type as disclosed herein includes a flat sheet metal, such as SPCC steel, aluminum, stainless steel, copper and the like, that may be formed to the particular shape of a gasket, and a coating layer of an elastic synthetic rubber material formed on the surface of the flat sheet metal. More recently, a gasket, known as a rubber coating-type gasket, has been developed and is actually used in particular applications. For this type of gasket, the coating layer of the elastic synthetic rubber material described above contains a fibrous material such as a compressible inorganic fiber or compressible organic fiber as disclosed in Japanese unexamined patent publication No. 63(1988)-96359.

So far, it has been expected that the rubber coating-type gasket provides advantages over any other prior art gasket types, in that the fibrous material contained in the coating of the rubber material may make the gasket more resistant to heat, may reduce the relaxation of stress to enable the gasket to hold torque, and may make the gasket more thick than a certain value.

For sheet metal gasket types having the coating layer of a synthetic rubber material formed on the sheet metal, as firstly mentioned above, any compression may easily cause excess transverse flow in the synthetic rubber material which may cause permanent compressive strain in the rubber material. When permanent compressive strain occurs, it may adversely affect the life time of the rubber material, and it is difficult to prevent deterioration of the rubber material due to the permanent compressive strain.

For gasket types having the coating of the rubber material containing a fibrous material therein, as secondly mentioned above, the tensile strength may be increased by the fibrous material combined with the rubber material, but the density and hardness of the material would necessarily be increased so that compressibility would be reduced under low loads. In other words, if the material exhibits a low compressibility when a low surface pressure is applied, it may not conform with the surface of any flanged portion, which may adversely affect the sealing function of the gasket material.

SUMMARY OF THE INVENTION

In view of the problems of the different prior art gasket material types as described above, the object of the present invention is to provide a gasket material which exhibits improved material properties including increased tensile strength, reduced stress relaxation and increased wear resistance. With those material properties, the gasket material is still capable of restoring itself from an applied compression, and is also impermeable to any liquid.

As described in brief by referring to the drawings and by referring to FIG. 1 in particular, a gasket material according to the present invention includes a sheet metal (1) and a coating layer of a compound, i.e. composition or mixture (2) formed on the sheet metal (1) and containing a rubber material as a principal component, wherein the rubber material includes specific proportions of other components, such as a fibrous material and fine cork particles, that are added to the rubber material.

More specifically, the gasket material according to the present invention includes a sheet metal (1) having a coating of any suitable heat resistant adhesive (3) applied thereon, and a coating layer of a compound or composition (2) formed on the sheet metal (1) and which may be composed of specific proportions of a fibrous material including compressible inorganic fiber or both of compressible inorganic fiber and compressible organic fiber, fine cork particles, a rubber material, and a rubber chemical. As the compound coating (2) includes several components as listed above, rather than the rubber material only, the gasket material according to the present invention provides excellent compressibility as well as adequate elasticity, and can meet dimensional requirements such as the thickness.

In the gasket material according to the present invention, the compound coating layer includes the fibrous material and the foamed material such as cork combined with the rubber material. Binding of the rubber material, the fibrous material and the foam material (cork) as well as the interaction of the fibrous material and the foam material (cork) may enhance material strength which may provide improved material properties including increased tensile strength, improved compressibility/elasticity, reduced stress relaxation, increased wear resistance, increased heat resistance and the like.

Thus, the present invention provides a gasket material that overcomes the problems of the prior an gasket types, particularly the rubber coating gasket type, and provides drastic improvements in various physical properties and sealing property as compared with those of the prior an gasket types.

Now, the cork material as one component of the gasket material according to the present invention is described. The cork material is in the form of botanical sponge that may be obtained from a tree, specifically the bark of cork oak. The sponge contains a collection of cells (twenty to forty millions per $cm^3$, each having 14 facets) and pores. Those cells and pores form a foam, which has the extremely low specific gravity of the order of 0.12 to 0.20 and is impermeable to any liquid. Thus, the foam is capable of restoring itself by 85% of the initial volume immediately, or by 94% in 24 hours, after it is compressed.

The cork material thus obtained is milled into fine particles each having a size of 0.1 to 1.0 mm in diameter, which are then mixed together. If each of these fine particles has a diameter of less than 0.1 mm, the total surface area formed by those cork particles that occupy the compound coating layer will be greater, which may undesirably reduce the ability of the binder or rubber material to bond with the cork particles. Conversely, for a cork particle size of more than 1.0 mm, the compound coating layer may have irregularities on the surface, which may adversely and undesirably affect the sealing ability when the surface pressure is extremely low.

For the fibrous material which is also a component of the gasket material, the compressible inorganic fiber may include glass fibers, ceramic fibers, rock wools, quartz or silica fibers, high silica fibers, alumina fibers, whisker fibers, boron fibers, carbon fibers, metal fibers and the like, and the compressible organic fiber may include polyamide fibers, polyolefin fibers, polyester fibers, polyvinyl chloride fibers, polyurethane fibers, phenol fibers, cellulose fibers and the like.

The fibrous material may include either a compressible inorganic fiber alone, or the combination of a compressible inorganic fiber and a compressible organic fiber.

In one preferred embodiment of the present invention, the compound or composition may be composed of the fibrous material that in this case includes a compressible inorganic fiber alone, fine cork particles, a rubber material and any suitable rubber chemical. Those components may be provided in specific proportions. A coating layer of the compound thus obtained may be formed on the surface of the sheet metal carrying the coating of heat resistant adhesive thereon, thus forming the gasket material. The gasket material thus formed can exhibit the improved material properties including the increased tensile strength, improved compressibility/elasticity, reduced stress relaxation, increased wear resistance, increased heat resistance and the like, as described earlier.

In another preferred embodiment of the present invention, the fibrous material may include the combination of a compressible inorganic fiber and a compressible organic fiber. The gasket material that is composed of such fibrous material and the other components as mentioned above provides greater flexibility as well as the improved material properties, as compared with the gasket material according to the before described first embodiment.

The rubber material that may be used for the purposes of the present invention includes nitrile rubber (NBR), styrene-butadiene rubber (SBR), isoprene rubber (IR), chloroprene rubber (CR), butadiene rubber (BR), isobutylene-isoprene rubber (IIR), ethylene propylene rubber (EPM), fluoro rubber (FPM), silicone rubber (Si), chlorosulfonated polyethylene (CSM), ethylene-vinylacetate copolymer (EVA), chlorinated polyethylene (CPE), chloro-isobutene-isoprene rubber (CIIR), epichlorohydrin rubber (ECO), nitrile isoprene rubber (NIR), natural rubber (NR) and the like.

The rubber chemical that may be used for the purposes of the present invention includes vulcanizing agents such as sulfur, zinc oxide, magnesium oxide and peroxide, dinitrobenzene, and vulcanization accelerators such as thiazole compounds, polyamine compounds, sulfenamide compounds, dithiocarbamate compounds, aldehydeamine compounds, guanidine compounds, thiourea compounds and xanthate compounds.

The heat resistant adhesive that may be used for the purposes of the present invention includes phenol adhesives, silane adhesives and epoxy adhesives. Isocyanate adhesives may be used when the bonding involves no vulcanization.

By way of examples, Tables 1 and 2 present the proportions by weight of the components of the compound coating layer (2) for the gasket materials according to the preferred embodiments of the present invention, respectively.

TABLE 1

| For the fibrous material including the compressive inorganic fiber alone: | |
| --- | --- |
| Components | Weight (%) |
| Inorganic fiber (glass fiber) | 15 to 25 |
| Cork particles | 10 to 20 |

TABLE 1-continued

| For the fibrous material including the compressive inorganic fiber alone: | |
| --- | --- |
| Components | Weight (%) |
| Rubber material | |
| NBR | 15 to 25 |
| SBR | 15 to 25 |
| Rubber chemical | 7 to 13 |
| Filler | 0 to 23 |

In the above table, if the proportion of the inorganic fiber (glass fiber) is less than 15%, the heat resistance will undesirably be reduced. If it is more than 25%, the compressibility of the compound coating layer will undesirably be reduced. The proportion of the cork particles below 10% will undesirably reduce the compressibility of the compound coating layer. If it is more than 20%, the bonding between the cork particles and the rubber material acting as the binder in the compound coating layer will be reduced, and the heat resistance will be reduced. It is undesirable.

The filler may be provided according to the requirement for adjusting the strength and hardness of the compound coating layer, and any type of filler that is commercially available in the relevant field may be used as required. The filler that may be used for the purposes of the present invention includes organic filler and inorganic filler. As the inorganic filler, clay, talc, barium sulfate, sodium bicarbonate, graphite, sulfate, tripoli, wollasnite and the like may be used.

TABLE 2

| For the fibrous material including the combination of the compressive inorganic fiber and compressive organic fiber: | |
| --- | --- |
| Components | Weight (%) |
| Inorganic fiber (glass fiber) | 20 to 30 |
| Cork particles | 5 to 10 |
| Rubber material | |
| NBR | 10 to 20 |
| SBR | 10 to 20 |
| Rubber chemical | 6 to 12 |
| Filler | 0 to 20 |

In the above table, if the proportion of the inorganic fiber (glass fiber) is less than 20%, the heat resistance will undesirably be reduced. If it is more than 30%, the compressibility of the compound coating layer will undesirably be reduced. If the proportion of the organic fiber is less than 5%, the flexibility of the compound coating layer will undesirably be reduced, while a proportion above 10% will reduce the dispersibility of the fibrous material across the compound coating layer, which is undesirable. Also a proportion of the organic fiber above 10% will raise the cost of forming the compound coating layer. If the proportion of the cork particles is below 10%, the compressibility of the compound coating layer will undesirably be reduced. If it is more than 20%, the bonding between the cork particles and the rubber material acting as the binder in the compound coating layer will be reduced, and the heat resistance will be reduced, which is undesirable.

The filler may be provided according to the requirement for adjusting the strength and hardness of the compound coating, and any type of filler that is commercially available in the relevant field may be used as required as described in the before mentioned Table 1.

According to the gasket material of the present invention, the compound or composition may be composed principally of the rubber material including the appropriate fibrous material and foam material including cork particles, and the compound coating layer formed on the sheet metal can be strengthened mechanically by the fibrous material coupled with the foam material including cork particles contained in the compound coating layer. Any possible breakage that might otherwise occur on the compound coating layer particularly when it is sealed under a high internal pressure can be prevented effectively. Any blow-by, movement or transverse flow also can be prevented.

As the rubber material contains the foam organic material in the form of fine cork particles that is capable of expanding and shrinking very easily, it provides strong elastic restoring capability, reduces relaxation of stress, and increases wear resistance, in addition, the rubber material is so impermeable to any liquid that liquid is prevented from entering the compound coating layer.

It may be appreciated from the foregoing description that the gasket material according to the present invention provides remarkable improvements in material properties, such as increased tensile strength, improved compressibility/elasticity, reduced stress relaxation, increased wear resistance, increased heat resistance and the like. It also provides for the enhanced sealing capability.

BRIEF DESCRIPTION OF DRAWINGS

The above and other objects, advantages, and features of the present invention will become apparent from the detailed description of several preferred embodiments of the present invention that follows by referring to the accompanying drawings, in which.

DESCRIPTION OF PREFERRED EMBODIMENTS

First Embodiment

In a first embodiment, a sheet metal (1) that may be used as a base metal for forming a gasket material is preferably a 0.25 mm-thick cold rolled steel blank. Preferably, the sheet metal (1) is processed at an initial step so that any grease may be removed from each of the opposite sides of the sheet metal. A coating (3) of any selected phenol adhesive is then applied onto each of the degreased sides, and is dried by heating it preferably at 70° C. A compound or composition may be formed by mixing a rubber material including 19% by weight of NBR rubber and 19% by weight of SBR rubber, 19% by weight of any selected inorganic fiber (such as glass fiber), 16% by weight of fine cork particles, 9.5% by weight of any selected rubber chemical, and 17.5% by weight of any selected filler. A coating of the compound thus obtained is then applied onto each of the sides of the sheet metal (1) to a thickness of preferably about 350 microns. Both sides of the sheet metal (1) each having the coating of the compound or composition are then processed so that a graphite layer may be formed on the coating of the compound on each side. The sheet metal (1) is then placed in an oven where it is vulcanized at 160° C. to 200° C. for about one hour. A gasket material thus obtained has a compound coating layer (2) formed on each of the sides of the sheet metal (1).

Second Embodiment

In a second embodiment, a sheet metal (1) that may be used as a base metal for forming a gasket material is preferably a 0.25 mm-thick cold rolled steel blank, which is the same as for the first embodiment. Preferably, the sheet metal (1) is processed at the initial step so that any grease may be removed from each of the opposite sides of the sheet metal. A coating (3) of any selected phenol adhesive is then applied onto each of the degreased sides, and is dried by heating it peferably at 70° C. A compound or composition may be formed by mixing a rubber material including 17.5% by weight of NBR rubber and 17.5% by weight of SBR rubber, 20% by weight of any selected inorganic fiber (such as glass fiber), 5% by weight of any selected organic fiber (such as amide fiber), 16% by weight of fine cork particles, 9% by weight of any selected rubber chemical, and 15% by weight of any selected filler. A coating of the compound thus obtained is then applied onto each of the sides of the sheet metal (1) to a thickness of preferably about 350 microns. Both sides of the sheet metal (1) each having the coating of the compound are then processed so that a graphite layer may be formed on the coating of the compound on each side. The sheet metal (1) is then placed in an oven where it is vulcanized at 160° C. to 200° C. for about one hour. A gasket material thus obtained has a compound layer (2) formed on each of the sides of the sheet metal (1).

Comparison

Figure 1:
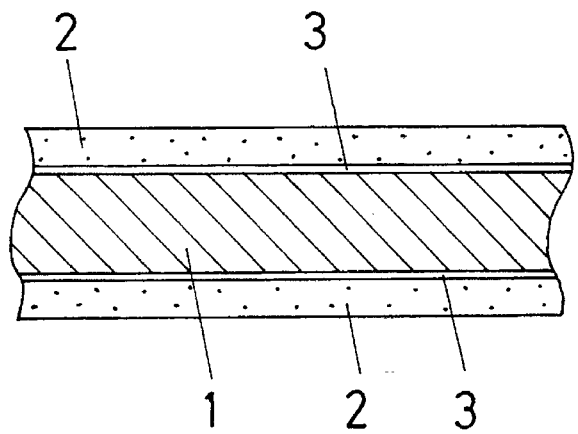
FIG. 1 is a sectional view illustrating the gasket material in accordance with one preferred embodiment of the present invention.
Figure 2:
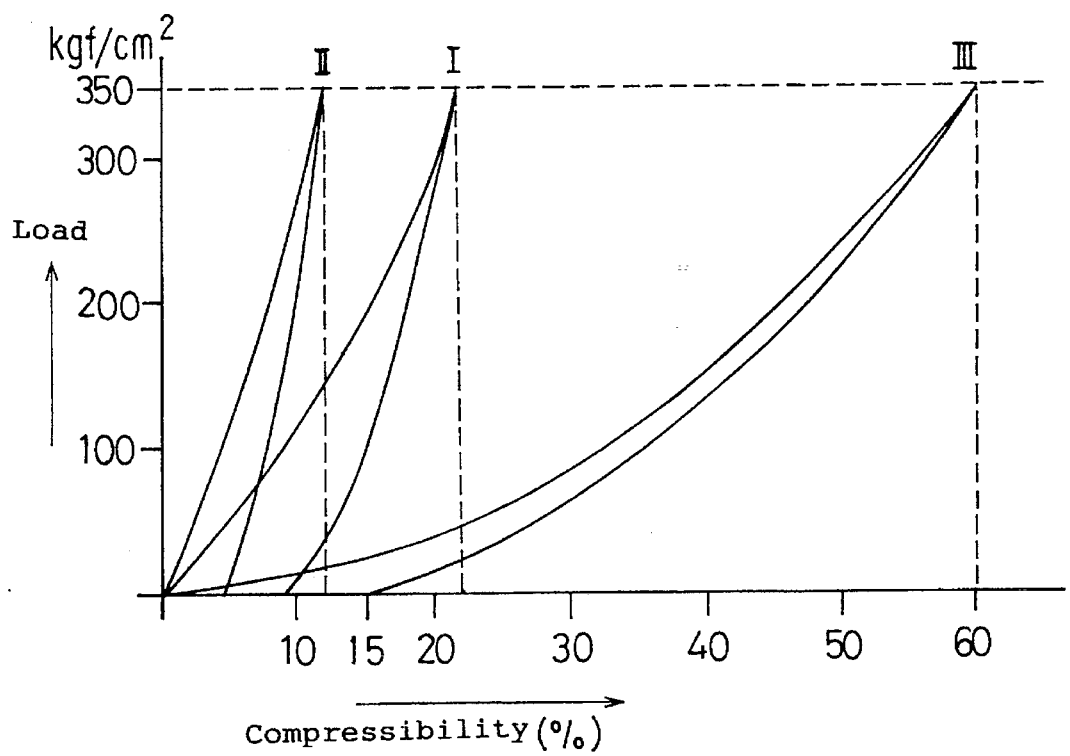
FIG. 2 is a diagram depicting three different load-compressibility curves, one for the gasket material according to the present invention and the other two for the gasket materials according to the prior art.

Three different load-compressibility curves are shown in FIG. 2. One is provided for the gasket material obtained according to the before described second embodiment of the present invention, another is provided for the prior art rubber coating type gasket material including the sheet metal and compound coating layer each having the same thicknesses as those for the gasket material of the present invention, respectively, and the other is provided for the prior art rubber coating type gasket material including the sheet metal and compound coating layer including the fibrous material each having the same thicknesses as those for the gasket material of the present invention.

It may be seen from FIG. 2 that the coating layer romped on the surface of the gasket material of the present invention provides the higher compressibility and restorability, as compared with those for the respective prior art gasket materials.

The compressibility and restorability may be expressed as follows, respectively:

Compressibility (%)=$(T_0-T_1)/T_0 \times 100$
Restorability (%)=$(T_2-T_1)/(T_0-T_1) \times 100$
where,
$T_0$=initial sheet thickness
$T_1$=sheet thickness as compressed
$T_2$=sheet thickness after load is removed Table 3 shows the values for the compressibility and restorability for the gasket material of the present invention and the prior art gasket materials, respectively, when the load of 350 Kgf/cm$^2$ in FIG. 2 is applied.

TABLE 3

|  | Compress (%) | Restore (%) |
| --- | --- | --- |
| (I) Prior art rubber coating gasket material | 22 | 59 |
| (II) Prior art rubber coating gasket material with fibrous material | 12 | 66 |
| (III) Gasket material of the present invention | 60 | 75 |

It may be seen from Table 3 that the coating layer formed on the surface of the gasket material of the present invention provides the higher compressibility and restorability, as compared with those for each respective one of the prior art gasket materials.

The gasket material obtained as described above in accordance with the present invention provides advantages over the prior art gasket materials in that it has the higher compressibility and restorability while maintaining mechanical strength.

Although the present invention has been described by referring to typical preferred embodiments thereof, it should be understood that various changes and modifications may be made thereto within the spirit and scope of the invention as defined in the appended claims.

What is claimed is:

1. A gasket material comprising:

a sheet metal blank having a surface having applied thereon a coating of heat resistant adhesive; and a coating layer formed on said surface on said adhesive, said coating layer comprising a composition containing proportions of 15 to 25% by weight of fibrous material including a compressible inorganic fiber, 10 to 20% by weight of cork material in fine particles, 30 to 50% by weight of rubber material, and 7 to 13% by weight of rubber chemical.

2. A gasket material as claimed in claim 1, wherein said cork material in fine particles has a size of 0.1 mm to 1.0 mm in diameter.

3. A gasket material comprising:

a sheet metal blank having a surface having applied thereon a coating of heat resistant adhesive; and a coating layer formed on said surface on said adhesive, said coating layer comprising a composition containing proportions of 15 to 25% by weight of fibrous material including a compressible inorganic fiber, 10 to 20% by weight of cork material in fine particles, 30 to 50% by weight of rubber material, 7 to 13% by weight of rubber chemical, and less than 23% by weight of filler material.

4. A gasket material as claimed in claim 3, wherein said cork material in fine particles has a size of 0.1 mm to 1.0 mm in diameter.

5. A gasket material comprising:

a sheet metal blank having a surface having applied thereon a coating of heat resistant adhesive; and a coating layer formed on said surface on said adhesive, said coating layer comprising a composition containing proportions of a fibrous material including 20 to 30% by weight of compressible inorganic fiber and 5 to 10% by weight of compressible organic fiber, 10 to 20% by weight of cork material in fine particles, 20 to 40% by weight of rubber material, and 6 to 12% by weight of rubber chemical.

6. A gasket material as claimed in claim 5, wherein said cork material in fine particles has a size of 0.1 mm to 1.0 mm in diameter.

7. A gasket material comprising:

a sheet metal blank having a surface having applied thereon a coating of heat resistant adhesive; and a coating layer formed on said surface on said adhesive, said coating layer comprising a composition containing proportions of a fibrous material including 20 to 30% by weight of compressible inorganic fiber and 5 to 10% by weight of compressible organic fiber, 10 to 20% by weight of cork material in fine particles, 20 to 40% by weight of rubber material, 6 to 12% by weight of rubber chemical, and less than 2% by weight of filler material.

8. A gasket material as claimed in claim 7, wherein said cork material in fine particles has a size of 0.1 mm to 1.0 mm in diameter.

* * * * *